(12) United States Patent
Berg et al.

(10) Patent No.: US 12,508,412 B2
(45) Date of Patent: Dec. 30, 2025

(54) COUPLING ELEMENT FOR A CLOSED FLUID TRANSFER SYSTEM, ATTACHMENT FOR A COUPLING ELEMENT OF THIS TYPE, COUPLING SYSTEM, AND COUPLING KIT

(71) Applicant: B. Braun Melsungen AG, Melsungen (DE)

(72) Inventors: Karl Martin Berg, Melsungen (DE); Nathanael Fischer, Bad Hersfeld (DE); Gerrit Seidel, Kassel (DE); Florin Kopp, Schortens (DE)

(73) Assignee: Braun Melsungen AG, Melsungen (DE)

( * ) Notice: Subject to any disclaimer, the term of this patent is extended or adjusted under 35 U.S.C. 154(b) by 780 days.

(21) Appl. No.: 17/909,405

(22) PCT Filed: Mar. 9, 2021

(86) PCT No.: PCT/EP2021/055842
§ 371 (c)(1),
(2) Date: Sep. 5, 2022

(87) PCT Pub. No.: WO2021/180675
PCT Pub. Date: Sep. 16, 2021

(65) Prior Publication Data
US 2023/0097647 A1    Mar. 30, 2023

(30) Foreign Application Priority Data
Mar. 11, 2020  (DE) .................... 10 2020 203 153.3

(51) Int. Cl.
*A61M 39/10*    (2006.01)
(52) U.S. Cl.
CPC ..... *A61M 39/10* (2013.01); *A61M 2039/1066* (2013.01); *A61M 2039/1077* (2013.01)

(58) Field of Classification Search
CPC .......... A61M 39/10; A61M 2039/1066; A61M 2039/1077; A61M 2039/1072;
(Continued)

(56) References Cited

U.S. PATENT DOCUMENTS

| 7,004,934 B2 | 2/2006 | Vaillancourt |
| 7,080,672 B2 | 7/2006 | Fournie |

(Continued)

FOREIGN PATENT DOCUMENTS

| EP | 2589367 A1 | 5/2013 |
| EP | 3517164 A1 | 7/2019 |

(Continued)

OTHER PUBLICATIONS

Search Report received in International Application No. PCT/EP2021/055842 dated Jul. 2, 2021, with translation, 7 pages.

*Primary Examiner* — Philip R Wiest
*Assistant Examiner* — Brandon W. Levy
(74) *Attorney, Agent, or Firm* — Christopher A. Rothe; CM Law

(57) ABSTRACT

A pair of coupling members for a joint closed fluid transfer system. Each coupling member of the pair of coupling members includes a coupling housing having a longitudinal axis, a fluid connection, and a coupling side. A sealing member receptacle, which is arranged in the coupling housing, includes at least one fluid-tight chamber formed by at least one sealing member arranged in the sealing member receptacle. A spike in the coupling housing in a spike receptacle, in particular a spike arranged eccentrically in the coupling housing, fluidly communicates with the fluid connection. In a first embodiment, the coupling members are each complementary to one another, in particular identical in construction, and are connectable without an adapter by a (Continued)

relative angular offset about their longitudinal axis, preferably by a relative angular offset of 90°.

21 Claims, 14 Drawing Sheets

(58) Field of Classification Search
CPC ...... A61M 2039/1027; A61M 39/1011; A61M 5/162; A61M 2005/3103; A61J 1/2096; A61J 1/201; A61J 1/2055; A61J 1/1406; A61J 1/2013; A61J 1/2065; A61J 1/2089; A61J 1/2048; A61J 1/18; A61J 1/20; A61J 1/2006; F16L 37/084; F16L 37/248; F16L 21/00; F16L 21/06; F16L 23/00; Y10S 604/905
See application file for complete search history.

(56) References Cited

U.S. PATENT DOCUMENTS

| | | |
|---|---|---|
| 7,396,051 B2 | 7/2008 | Baldwin |
| 7,497,848 B2 | 3/2009 | Leinsing |
| 7,628,781 B2 | 12/2009 | Roy |
| 8,196,614 B2 | 6/2012 | Kriheli |
| 8,262,641 B2 | 9/2012 | Vedrine |
| 8,267,127 B2 | 9/2012 | Kriheli |
| 8,287,513 B2 | 10/2012 | Ellstrom |
| 8,870,832 B2 | 10/2014 | Raday |
| 8,915,902 B2 | 12/2014 | Reynolds |
| 9,039,047 B2 | 5/2015 | Imai |
| 9,345,643 B2 | 5/2016 | Okiyama |
| 9,510,997 B2 | 12/2016 | Kriheli |
| 9,541,227 B2 | 1/2017 | Okiyama |
| 9,549,873 B2 | 1/2017 | Barrelle |
| 9,579,258 B2 | 2/2017 | Fukuoka |
| 9,636,278 B2 | 5/2017 | Sanders |
| 9,642,775 B2 | 5/2017 | Sanders |
| 9,724,504 B2 | 8/2017 | Fangrow, Jr. |
| 9,775,979 B2 | 10/2017 | Okiyama |
| 9,855,192 B2 | 1/2018 | Kim |
| 9,951,899 B2 | 4/2018 | Py |
| 9,974,939 B2 | 5/2018 | Fangrow, Jr. |
| 9,999,569 B2 | 6/2018 | Kriheli |
| 10,022,531 B2 | 7/2018 | Shemesh |
| 10,058,693 B2 | 8/2018 | Phillips |
| 10,156,306 B2 | 12/2018 | Fangrow |
| 10,206,853 B2 | 2/2019 | Sanders |
| 10,206,854 B2 | 2/2019 | Wu |
| 10,357,430 B2 | 7/2019 | Kriheli |
| 10,376,654 B2 | 8/2019 | Sanders |
| 10,398,627 B2 | 9/2019 | Kriheli |
| 10,441,507 B2 | 10/2019 | Sanders |
| 10,456,329 B2 | 10/2019 | Sanders |
| 10,470,974 B2 | 11/2019 | Sanders |
| 10,518,078 B2 | 12/2019 | Stjernberg Bejhed |
| 10,561,802 B2 | 2/2020 | Kim |
| 10,632,044 B2 | 4/2020 | Garfield |
| 10,682,505 B2 | 6/2020 | Shemesh |
| 2016/0008544 A1 | 1/2016 | Reisenburg Molson |
| 2016/0136412 A1 | 5/2016 | McKinnon et al. |
| 2018/0000690 A1 | 1/2018 | Eichelkraut |
| 2018/0028402 A1 | 2/2018 | Kriheli |
| 2018/0161245 A1 | 6/2018 | Kriheli |
| 2018/0200147 A1 | 7/2018 | Sanders |
| 2018/0200148 A1 | 7/2018 | Sanders |
| 2018/0200498 A1 | 7/2018 | Sanders |
| 2019/0000718 A1 | 1/2019 | Kriheli |
| 2019/0046410 A1 | 2/2019 | Shemesh |
| 2019/0053980 A1 | 2/2019 | West |
| 2019/0060171 A1 | 2/2019 | Lee |
| 2019/0290543 A1 | 9/2019 | McKinnon |
| 2019/0321261 A1 | 10/2019 | Oshinski |

FOREIGN PATENT DOCUMENTS

| | | |
|---|---|---|
| WO | 2015069643 A1 | 5/2015 |
| WO | 2018136361 A1 | 7/2018 |
| WO | 2019086589 A1 | 5/2019 |
| WO | 2019135219 A2 | 7/2019 |
| WO | 2020031174 A1 | 2/2020 |

COUPLING ELEMENT FOR A CLOSED FLUID TRANSFER SYSTEM, ATTACHMENT FOR A COUPLING ELEMENT OF THIS TYPE, COUPLING SYSTEM, AND COUPLING KIT

CROSS-REFERENCE TO RELATED APPLICATIONS

This application is the United States national stage entry of International Application No. PCT/EP2021/055842, filed Mar. 9, 2021, and claims priority to German Application No. 10 2020 203 153.3, filed Mar. 11, 2020.

FIELD

The invention relates to a coupling member for a closed fluid transfer system, an attachment for such coupling member, a coupling system and a coupling kit.

BACKGROUND

Many substances that are administered as injections or in a comparable form of delivery, such as CMR drugs, which are used in cancer therapy, for example, and whose therapeutic application is primarily aimed at damaging growth-intensive tumor cells, have a considerable hazard potential outside the actual therapeutic application. Due to their mechanism of action, some of these substances are themselves carcinogenic, which is why contact with persons not undergoing therapy must be avoided. Closed drug transfer systems, so called "closed system transfer devices" or CSTDs, are therefore increasingly being used for CMR drugs in the manufacture of ready-to-use preparations. An important component of such CSTDs are coupling systems that enable the safe transfer of CMR drugs or other substances and dry seal after disconnection, thus protecting the environment from contamination, e.g. through leakage or droplet formation on the surfaces of the coupling members. Coupling systems of this type are, in general, associated with the terms "dry connection", "automatic self-sealing technology" or "closed connection" and are essential for the realization of closed fluid transfer systems.

Known coupling systems comprise coupling members with a respective female and male coupling side or other different coupling sides such that different coupling members have to be available for such coupling systems for connection. This does not only influence the provision, but also the manufacturing of respective coupling systems. In addition, adapters have to be provided for such coupling systems to, for example, enable two syringes to be coupled together.

A further disadvantage of the known coupling systems or the coupling members associated therewith is the poor accessibility of the coupling surfaces to be connected with each other during a connection, complicating disinfection of these surfaces.

SUMMARY

In view of the disadvantages associated with the prior art, it is an object of the present invention to provide a coupling member, an attachment for such coupling member, a coupling system and a coupling kit, which provide an improved handling.

In a first aspect, the invention provides a pair of coupling member for a joint closed fluid transfer system, wherein each coupling member of the pair of coupling members comprises: a coupling housing having a longitudinal axis and comprising a fluid connection and a coupling side, a sealing member receptacle, arranged in the coupling housing, comprising at least one fluid-tight chamber formed by at least one sealing member arranged in the sealing member receptacle, and a spike in the coupling housing in a spike receptacle, in particular a spike arranged eccentrically in the coupling housing, for fluid communication with the fluid connection, wherein the coupling members are each complementary to one another, in particular identical in construction, and are connectable without an adapter by a relative angular offset about their longitudinal axis, preferably by a relative angular offset of 90°.

In a second, more specific aspect, the invention provides a coupling member for a closed fluid transfer system, comprising: a coupling housing comprising a fluid connection and a coupling side, a sealing member receptacle, arranged in the coupling housing, comprising at least one fluid-tight chamber formed by at least one sealing member arranged in the sealing member receptacle, and a spike in the coupling housing in a spike receptacle, in particular a spike arranged eccentrically in the coupling housing, for fluid communication with the fluid connection, wherein the sealing member receptacle is movable in a direction along the spike relative to the spike, and/or the spike is movable in its longitudinal direction relative to the sealing member receptacle, and wherein the spike, starting from a spike tip facing away from the spike receptacle, comprises at least one front fluid opening and a rear fluid opening, wherein the front fluid opening is positioned such that it projects beyond the side of the fluid-tight chamber facing away from the spike receptacle in a movement end position of the sealing member receptacle facing the spike receptacle and/or in a movement end position of the spike facing the coupling side, and is arranged in the fluid-tight chamber in a movement end position of the sealing member receptacle facing away from the spike receptacle and/or in a movement end position of the spike facing away from the coupling side.

According to the above configuration, the coupling member thus provides a disconnected state, in which the sealing member receptacle is located in a movement end position facing the coupling side and/or the spike is located in a movement end position facing the spike receptacle, and a connected state, in which the sealing member receptacle is located in a movement end position facing the spike receptacle and/or the spike is located in a movement end position facing the coupling side, due to the relative movement between the spike and the sealing member receptacle. The disconnected state refers to an initial state of the coupling members without external application of force. A connected state is understood as the state, in which a fluid exchange with a further coupling member or an attachment can be provided. Accordingly, the front fluid opening projects beyond the side of the fluid-tight chamber facing away from the spike receptacle to be movable into a further coupling member or an attachment for fluid exchange.

The rear fluid opening is provided to also enable a fluid exchange with a spike of a further coupling member or attachment engaging into the coupling member in the connected state. In other words, a fluid exchange may be carried out via the front fluid opening and/or the rear fluid opening. Hence, complementary coupling members may be used, for example, since the respective front fluid opening of the one spike is capable of interacting with the respective rear fluid opening of the other spike to be capable of forming a fluid communication. If only one front fluid opening were provided respectively, no fluid communication would be established in the connected state. If only a front fluid opening of the one spike and a rear fluid opening of the other spike were provided, different coupling members would again have to be provided.

The term "complementary" refers to the two coupling members of the pair of coupling members, in particular, the term "complementary" refers to a functionally equivalent configuration for connection for a fluid exchange. For example, complementary coupling members may provide differences in their components not intended for the fluid communication or differences, which have no effect on the fluid communication as such. Thereby the compatibility may be enhanced or the number of variants may be reduced. For a further reduction of the number of variants, also structurally identical coupling members may be provided. The term "structurally identical" refers to the two coupling members of the pair of coupling members, which are at least structurally identical in the required coupling area.

In terms of favoring compatibility, the spike of the coupling member may be in particular arranged eccentrically in the coupling housing, so that, for example, when it is connected to a further coupling member, the spike can be guided alongside the spike of this further coupling member.

In an embodiment, the at least one rear fluid opening is arranged in the fluid-tight chamber in a movement end position of the sealing member receptacle facing the spike receptacle and/or in a movement end position of the spike facing the coupling side.

Accordingly, the rear fluid opening is arranged in the fluid-tight chamber in the connected state, such that no fluid may escape therethrough. The discharge of fluids may therefore only take place via the front fluid opening in an adequate state. Possible protective measures may consequently be limited to the front fluid opening.

In a further development, the fluid-tight chamber is formed by two sealing members, wherein, preferably, the sealing member facing the spike receptacle is in a positionally fixed relationship relative to the spike and the sealing member receptacle is moveable thereto relative to the spike.

Insofar as the fluid-tight chamber is not formed by one sealing member or the interaction of one sealing member with the coupling housing, but by two sealing members, the design of the sealing members may be simplified and/or the volume of the fluid-tight chamber may be adjusted flexibly.

If the sealing member facing the spike receptacle is in a positionally fixed relationship with respect to the spike, wherein the rear fluid opening is consequently arranged on a side of the sealing member facing the spike receptacle, which faces away from the spike receptacle, the volume of the fluid-tight chamber is decreased by moving the sealing member receptacle with the sealing member facing the coupling side during connecting starting from a disconnected state. Thereby, the volume of the fluid-tight chamber can be reduced to a minimum volume required for a fluid exchange in the connected state. Thus, at the same time, the amount of the fluid not exchanged directly, which may remain in the fluid-tight chamber upon disconnection, is reduced.

In particular, the coupling housing comprises a compressible sealing member, which connects the spike receptacle with the sealing member receptacle in a fluid-tight manner.

Due to the compressible sealing member, the rear fluid opening may also be arranged outside the fluid-tight chamber in the disconnected state, since remaining fluid residues can also not escape in the region of the rear fluid opening. In this configuration, one or two sealing members forming the fluid-tight chamber may, for example, be arranged positionally fixed in the sealing member receptacle. The one or two sealing members are positioned in the sealing member receptacle in such a way that the rear fluid opening is located in the fluid-tight chamber formed by the one or two sealing members in the connected state, i.e. in a movement end position of the sealing member receptacle facing the spike receptacle.

The compressible sealing member may be formed of an elastic material and/or provides a telescope-like structure.

In a further configuration, the coupling member comprises, in a radial circumferential surface with respect to the direction of extension of the spike in the circumferential direction, at least two fastening portions, which are each formed for the engagement of a fastening member, and wherein the radial circumferential surface forms fastening member portions in the regions located between the fastening portions in the circumferential direction, each of which comprising at least one fastening member.

Accordingly, the radial circumferential surface of the coupling member is divided in the circumferential direction in at least two fastening portions and at least two fastening member portions. A tilt-resistant fastening member reception or a tilt-resistant fastening member engagement can be implemented by the at least two fastening portions or fastening member portions, respectively. If the arrangement is provided at an outer circumferential surface, a good accessibility or also a visual control option of the fastening results therefrom.

Further, the above configuration supports the formation of complementary or structurally identical coupling systems as described later, since the coupling member is suitable for the fastening member reception as well as for the fastening member engagement.

In a further development, the fastening portions are formed by the sealing member receptacle, which are accessible from the coupling side by means of recesses in the coupling housing, which are open towards the coupling side, wherein, in particular, the fastening member portions correspond to the fastening portions.

The formation of the fastening portions by the sealing member receptacle ensures that the sealing member receptacle and thus the sealing member on the coupling side are retained in a positionally fixed relationship to another coupling member or attachment when fastened thereto. Good accessibility of the fastening portions is achieved via the recesses in the coupling housing which are open towards the coupling side.

In the sense of using complementary or structurally identical coupling members for a coupling system or complementary coupling members and attachments, it is furthermore advantageous if the fastening member portions correspond to the fastening portions in that the fastening portions or the recesses provided for this purpose permit the fastening member portions to be connected. Accordingly, the width of the fastening portions or the recesses in the circumferential direction should essentially correspond to the width of the fastening member portions or the areas between the recesses. The term "substantially" is directed to the fact that a predetermined clearance may be provided for unobstructed guidance and/or manufacturing-related tolerances may have an influence. Likewise, certain shaping may result in deviations, but these should have no influence on the predominant guiding properties.

In particular, the at least one fastening member of the respective fastening member portion is formed by the sealing member receptacle.

Comparable to the formation of the fastening portions by the sealing member receptacle, the formation of the fastening members by the sealing member receptacle may also support the positionally fixed fastening of the sealing member receptacle. In the case of complementary or structurally identical coupling members, for example, the sealing member receptacles of the coupling members are retained positionally fixed to one another in the connected state, in particular when the fastening portions and the fastening members are formed by the sealing member receptacle. This may ensure a predetermined surface pressure between the sealing surfaces on the respective coupling side in order to ensure a fluid-tight connection of the coupling members, so that a fluid exchange may be carried out without the fluid to be exchanged escaping to the outside.

The at least one fastening member may, for example, be designed as a snap hook member projecting laterally in the direction of the coupling side beyond the coupling side sealing member.

In a further development, the fastening members of the sealing member receptacle are affixable in a fastening portion via the coupling housing.

For this purpose, the coupling housing surrounds the fastening members of the sealing member receptacle in the area of the fastening member portions, for example. In other words, in the area of the fastening member portions, the housing forms a respective coupling housing portion projecting in the direction of the coupling side. The sealing member and the coupling housing are thereby movable relative to each other in a direction along the spike, so that the fastening member is also movable relative to the coupling housing in a direction along the spike. The coupling housing is designed in such a way that the fastening member may be brought into overlap with a fastening portion of another coupling member or attachment in a disconnected state. If the coupling member is now transferred to a connected state by movement of the sealing member receptacle from a movement end position facing the coupling side to movement end position facing the spike, the coupling housing or a projecting coupling housing portion formed by the latter slides further over the fastening member, wherein the contour of the coupling housing interacting with the fastening member moves the fastening member to a position in which it is brought into engagement with the fastening portion of the further coupling member or attachment and retained. In an exemplary embodiment, the respective fastening member is configured as a snap hook member, wherein, in particular, the portion of the fastening member comprising the snap hook comprises a radially outwardly facing projection. In the disconnected state, this projection rests on a radial projection formed by the coupling housing on its inner surface. If the sealing member receptacle is now moved in the direction of the spike receptacle, the projection is guided past the shoulder and enters a region with a smaller inner diameter. Consequently, the fastening member is pressed radially inwards in this region and is retained in engagement with a corresponding fastening portion. The connection may thus only be released again in the disconnected state.

In an embodiment, the fastening portions and the fastening member portions are formed complementary to each other such that a fluid-tight communication is accomplished when connected to a complementary or structurally identical coupling member.

The complementary design of the fastening portions and fastening member portions relates to an configuration, in which the fastening portions and fastening member portions correspond to each other. This may be clarified by the use of structurally identical coupling members for a coupling system, in which the fastening portions of one coupling member correspond to the fastening member portions of the other coupling member, and vice versa. In the event of complementary coupling members, it is at least sufficient that the fastening portions and fastening member portions correspond to each other. In other words, the fastening portion is a projection or negative of its respective fastening member portion, and vice versa.

In a further configuration, the coupling housing is relatively movable with respect to the sealing member receptacle only when the respective fastening member forms a coupling state with the fastening portion of the other coupling member when connected to a complementary or structurally identical coupling member.

In the case of the snap hook with the radial projection as fastening member described by way of example above, the snap hook may, for example, only pass over the shoulder formed by the coupling housing if the snap hook can be moved inwards at least in accordance with the radial extension of the shoulder. This may be particularly prevented initially by the coupling member to be coupled comprising a diameter in the area of the snap hooks until the engagement for the fastening member in the fastening portion is reached, which does not permit the necessary radial movement of the snap hook. Only the engagement formed by a recess then enables the release of movement. In the sense of complementary or structurally identical coupling members, the requirement with respect to two coupling members may be projected onto one coupling member.

The invention is also directed to an attachment for a coupling member as described above, wherein the attachment comprises a fastening portion configured such that it is affixable in the coupling member in a movement end position of the sealing member receptacle facing the spike receptacle.

The attachment may, for example, be provided for connection to a syringe or other equipment of a fluid transfer system. Accordingly, the application field of a coupling member described above may be extended via the attachment. The fastening portion according to the invention may provide a connection for fluid exchange comparable to a coupling of two coupling members described above, so that no further provisions need to be made for the attachment on the coupling member side.

In a further aspect, the invention relates to a coupling system comprising two coupling members as described above.

Accordingly, the coupling system comprises the advantages described for the coupling members.

In an embodiment, the coupling members are complementary or structurally identical and may particularly be coupled by a relative angular offset about their longitudinal axis in accordance with the positions of the fastening portions, preferably by 90°.

The complementary or structurally identical configuration may reduce the number of variants so that, in addition to advantages in the provision of corresponding coupling members for a coupling system, confusion of coupling members may also be avoided. In the sense of complementary coupling members, moreover, different variants may in turn be provided without this necessarily having any influence on the coupling of the coupling members themselves.

In a further development, at least one of the respective front fluid openings, in particular both of the front fluid openings, is arranged in the fluid-tight chamber of the respective other coupling member in a coupling state, in which the respective sealing member receptacles are located in a movement end position facing the respective spike receptacle, and is in fluid communication with the respective rear fluid opening of the other coupling member, which is preferably also arranged in said fluid-tight chamber in the coupling state.

Accordingly, a front fluid opening in the connected state is located in the fluid-tight chamber in which the rear fluid opening of the connected other coupling member is also arranged, so that fluid exchange may take place thereby. In the sense of complementary, in particular structurally identical coupling members, the spike is designed in such a way that the respective coupling system mutually provides the arrangement of the respective front fluid openings in the fluid-tight chamber in connection with the rear fluid opening. Fluid exchange may thus be made possible starting from one coupling member as well as from the other.

In particular, the sealing surfaces of the sealing members of the coupling members facing the coupling side are in contact with each other in the coupling state, and the contact is only cancelled when the respective sealing member receptacles are in a movement end position facing away from the respective spike receptacle.

The contact between the sealing surfaces facing the coupling side may ensure a fluid-tight connection between the coupling members. In particular, the sealing surfaces are not simply in contact, but are retained under a predetermined surface pressure.

In order to cancel the fluid-tight connection of the coupling members only, if possible, when the respective front fluid opening no longer projects beyond the sealing surface in the direction of the coupling side, in particular the spike with any fluid residues still located therein as a whole, the possibility of releasing the contact surfaces may, for example, only be provided when the coupling members are in the disconnected state, as may be the case when the sealing member receptacle reaches a movement end position facing away from the spike receptacle assigned to it. In one implementation embodiment, at least one of the coupling members comprises therefore, for example, a fastening member that is locked in a fastening position by the coupling housing until a disconnected state is reached or at least until shortly before.

The invention also relates to a coupling kit comprising an attachment and a coupling member according to the above explanations or a coupling system as described above.

The coupling kit comprises the advantages described for its component.

BRIEF DESCRIPTION OF THE DRAWING FIGURES

Features, expediencies and advantages of the invention are also described below with reference to the drawings by way of embodiments.

Figure 11:
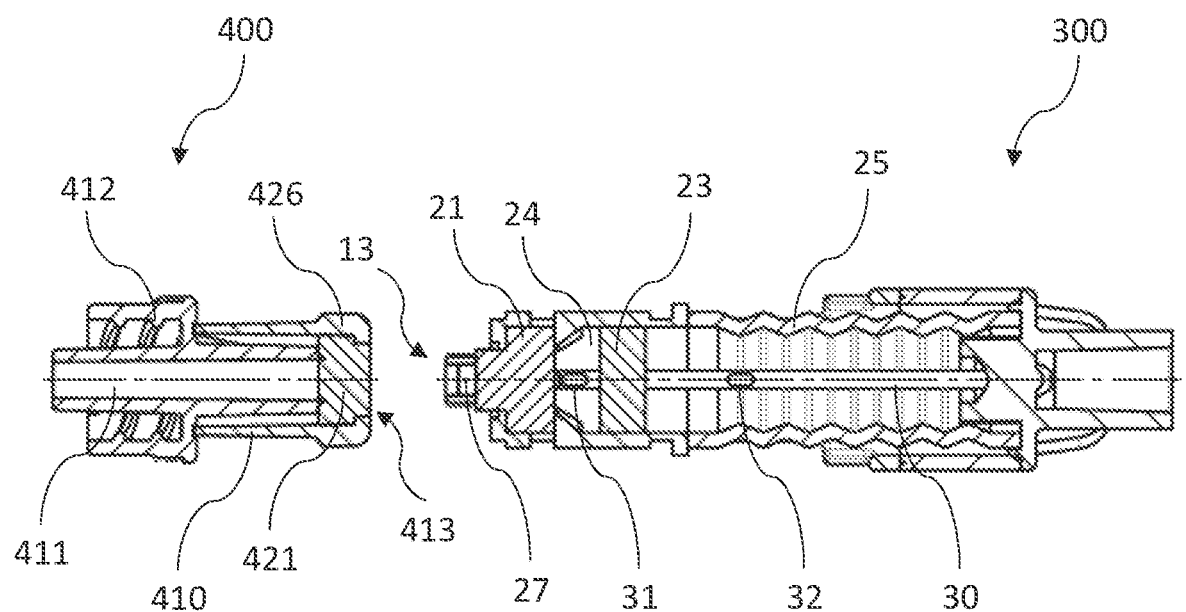
FIG. 11 is a cross-sectional view of a coupling member according to the third embodiment in a sectional plane through the fastening member portions, and an attachment in a disconnected state according to a coupling kit of FIG. 12.
Figure 12:
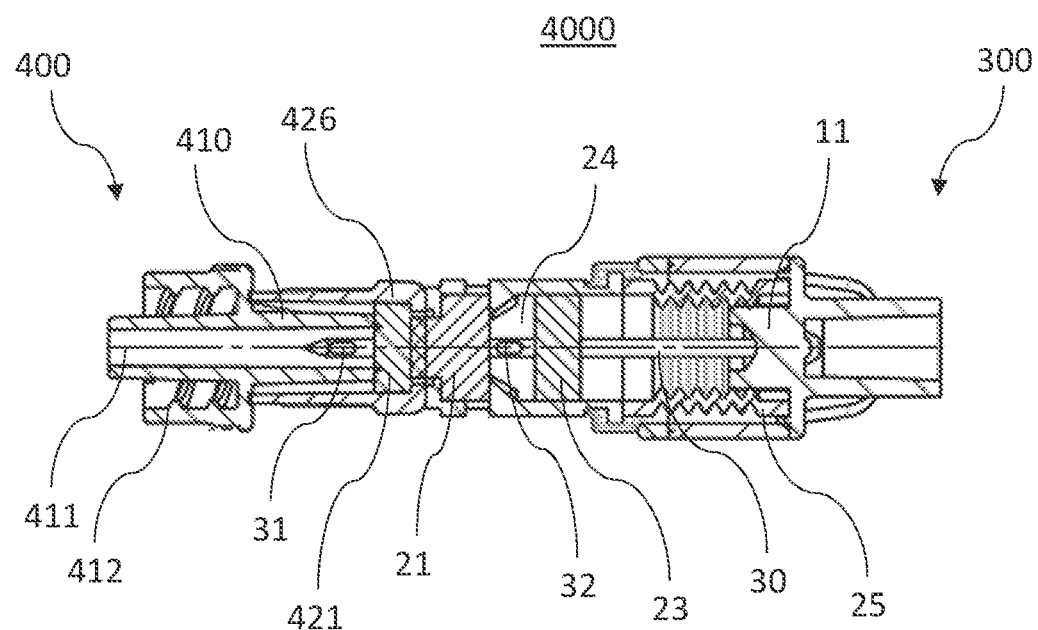
FIG. 12 is a cross-sectional view of a coupling kit with a coupling member according to the third embodiment and an attachment in a connected state.
Figure 19:
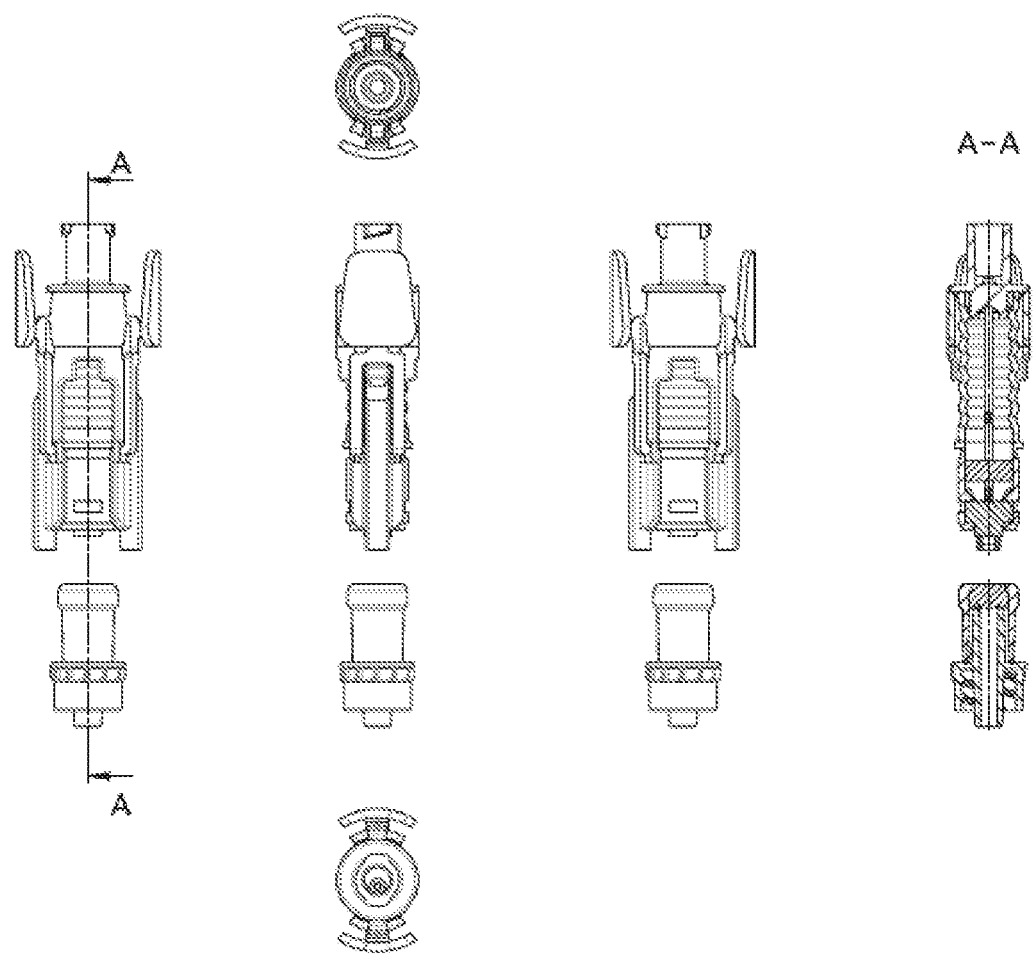
Figure 19:
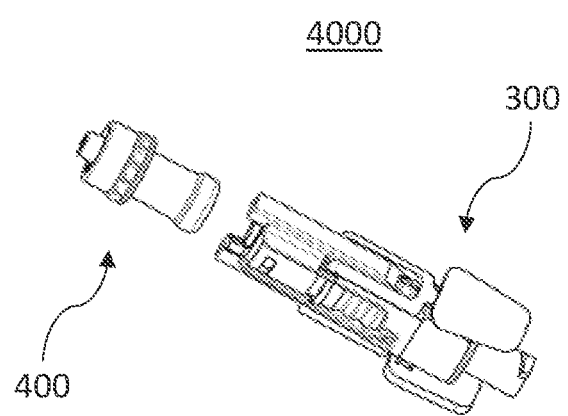
Figure 20:
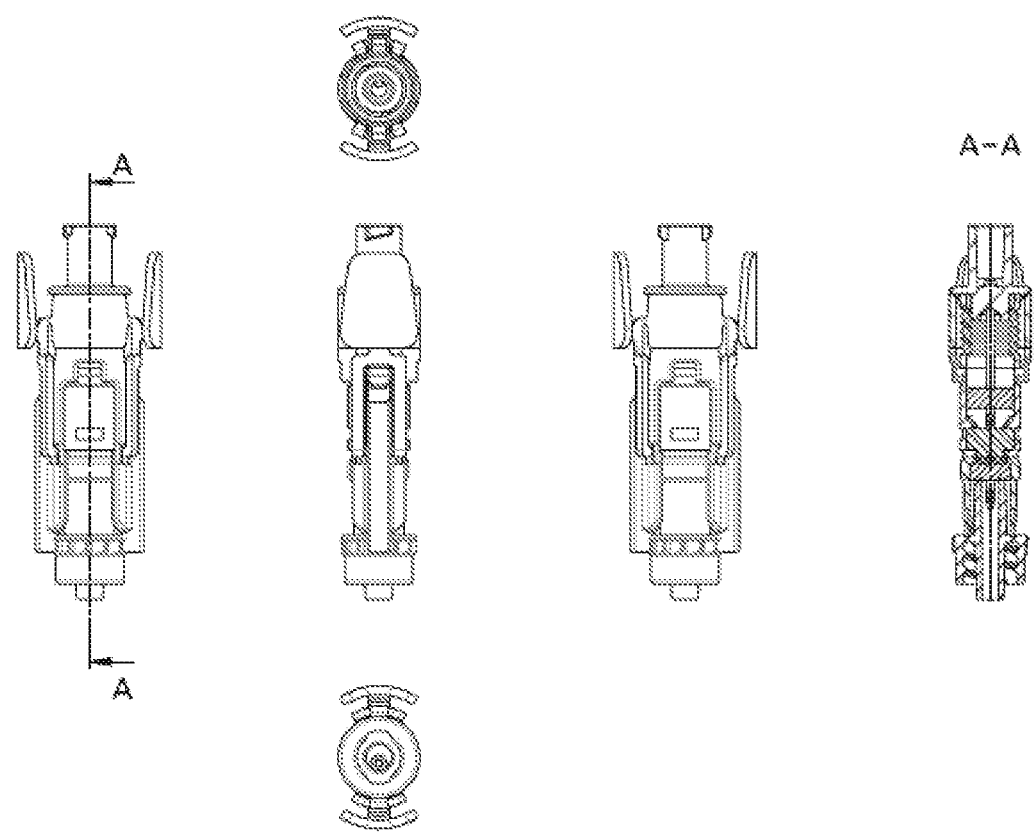
Figure 20:
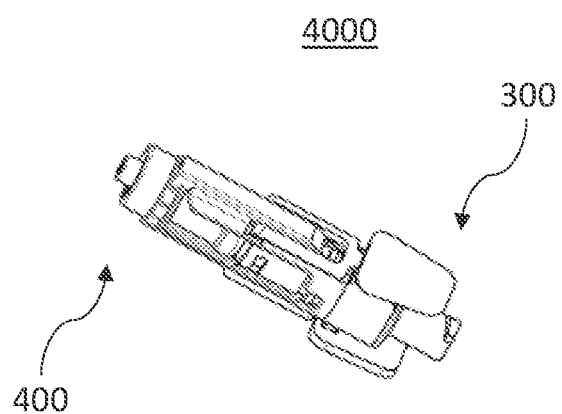

FIG. 19 is an overview of the external views of the coupling system according to FIGS. 11 and 12, the sectional view along intersection line A-A as well as a perspective view in the disconnected state; and FIG. 20 is an overview of the external views of the coupling system according to FIGS. 11 and 12 and FIG. 19, respectively, the sectional view along intersection line A-A as well as a perspective view in the connected state.

DETAILED DESCRIPTION

Figure 1:
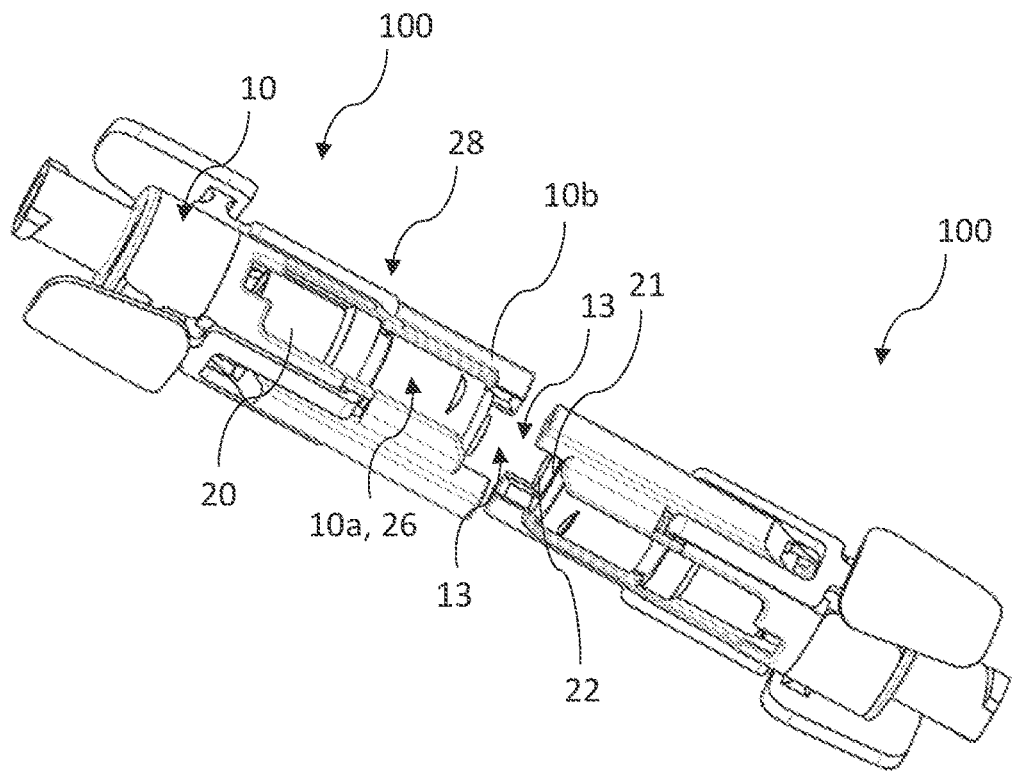
FIG. 1 is a perspective view of two coupling members according to a first embodiment in a disconnected state, forming a coupling system according to FIG. 4.
Figure 2:
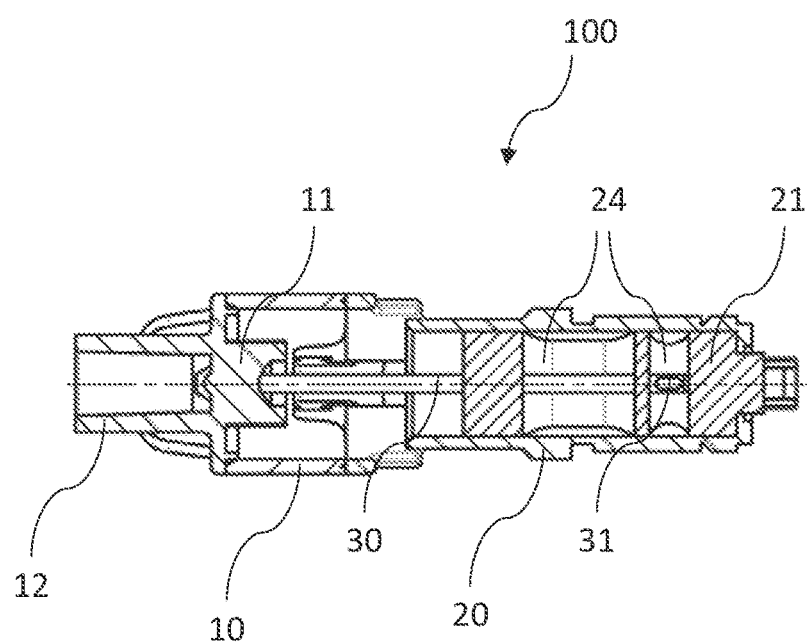
FIG. 2 is a cross-sectional view of a coupling member according to FIG. 1 in a sectional plane through the fastening portions.
Figure 3:
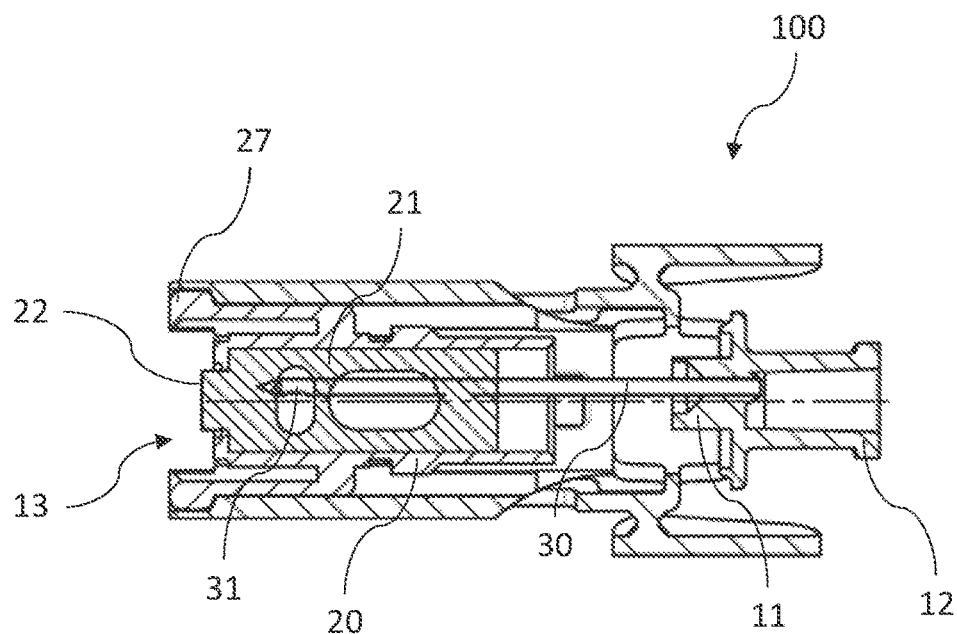
FIG. 3 is a cross-sectional view of a coupling member according to FIG. 1 in a sectional plane through the fastening member portions.
Figure 4:
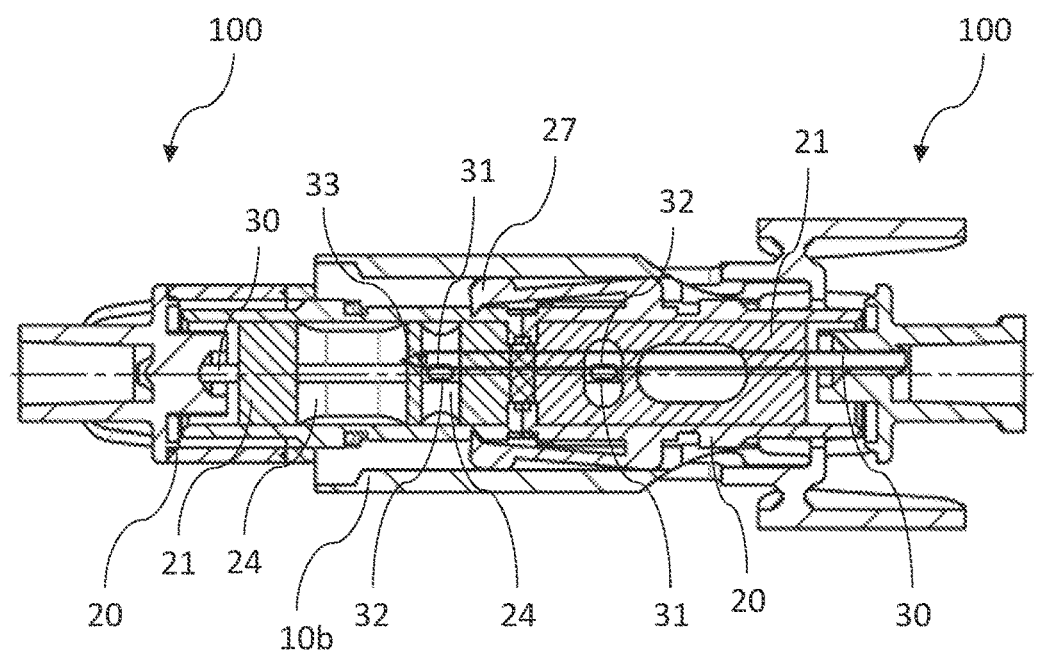
FIG. 4 is a cross-sectional view of a coupling system with two (one pair) coupling members according to the first embodiment in a connected state.

FIG. 1 shows a perspective view of two coupling members 100 according to a first embodiment in a disconnected state, forming a coupling system 1000 according to FIG. 4. The coupling members 100 each comprise a coupling housing 10 extending along a longitudinal axis from a fluid connection 12 to a coupling side 13. The coupling housing 10 further preferably comprises two opposing recesses 10a open towards the coupling side 13, which are formed between coupling housing portions 10b projecting towards the coupling side 13. A sealing member receptacle 20 is arranged in the coupling housing 10, which in this embodiment is movable along the spike 30 from a movement end position facing the coupling side 13 to a movement end position facing the spike receptacle 11, as shown for example in FIG. 2 with the spike 30, and vice versa. In the disconnected state shown here, the sealing member receptacle 20 is in its movement end position facing the coupling side 13. The sealing member receptacle 20 forms a fastening portion 26 in the region of each of the recesses 10a, which serves to engage a fastening member 27, as shown for example in FIG. 3. For this purpose, the fastening portion 26 in the first embodiment comprises a groove extending in the circumferential direction. Between the fastening portions 26 are fastening member portions 28, each of which comprises at least one fastening member 27, as shown and further explained with reference to FIG. 3. In addition, a sealing surface 22 of a sealing member 21 facing the coupling side 13 is indicated in FIG. 1, as also shown in FIG. 2. At least the sealing member portion comprising the sealing surface 22 is connected to the sealing member receptacle 20 in a positionally fixed manner in order to seal the sealing member receptacle 20 in a fluid-tight manner. In the disconnected state, the spike 30 does not project beyond the sealing surface 22 in the direction of the coupling side.

To further illustrate the embodiment of the coupling member 100 according to the first embodiment, FIG. 2 shows a cross-sectional view of the coupling member 100 according to FIG. 1 in a sectional plane through the fastening portions 26 of the sealing member receptacle 20 in the disconnected state. The sealing member 21 comprises two fluid-tight chambers 24 between its sealing surface 22 facing the coupling side 13 and its side facing the spike receptacle 11. The fluid-tight chamber 24 facing the coupling side 13 is arranged around the front fluid opening 31 of the spike 30 in the disconnected state. The rear fluid opening 32, which here comprises an angular offset with respect to the front fluid opening 31 with respect to the longitudinal axis of the spike 30 and is thus not visible in FIG. 2, is arranged in the fluid-tight chamber 24 facing away from the coupling side 13. Due to the configuration and arrangement of the sealing member 21 in cooperation with the fluid openings 31, 32, the sealing member receptacle 20 is fluid-tight with respect to the fluid openings 31, 32, so that, for example, a further seal between the coupling housing 10 and the sealing member receptacle 20 may be omitted. The sealing member 21 is thus here also connected to the sealing member receptacle 20 in a positionally fixed manner generally and is moved relatively along the spike 30 therewith via the movement of the sealing member receptacle 20.

As can be seen from FIG. 3, which shows a cross-sectional view of a coupling member 100 according to FIG. 1 in a sectional plane through the fastening member portions 28, the fastening member portions 28 being opposite one another each comprise a fastening member which is formed here, by way of example, from a snap hook member extending laterally in the direction of the coupling side 13. In order to be able to lock the snap hooks of the fastening members 27 in a groove of a fastening portion 26, as in the case of a connection of structurally identical coupling members 100, the snap hooks each comprise a radially outwardly projecting projection which, in the disconnected state, rests in a radial recess in the projecting coupling housing portion 10b. Starting from the coupling side recess, the guidance path of the coupling housing portion 10b for guiding the snap hook of the fastening member 27 of smaller diameter relative to the recess extends in the direction of the spike receptacle 11. When the snap hook of the fastening member 27 is moved in the direction of the spike receptacle and guided past the recess into the region of smaller inner diameter, the snap hooks are pressed radially inwardly and may thus be engaged and locked with a fastening portion 26 of another coupling member 100. The locking may only be released again in a disconnected state, in which the projections can be moved back radially into the recesses.

To illustrate an exemplary embodiment of a coupling system according to the invention and to further explain the coupling member 100, FIG. 4 shows a cross-sectional view of a coupling system 1000 with two coupling members 100 according to the first embodiment in a connected state. For connection, the structurally identical coupling members 100 are arranged with their opposing coupling sides offset by 90° relative to each other and pushed into each other. The projecting coupling housing portions 10b of the respective coupling member 100 are moved into the corresponding recesses 10 of the respective other coupling member 100. In the area of the recesses, the sealing member receptacle 20 thereby comprises a diameter by which the snap hooks of the fastening members 27 are initially retained in the recesses of the projecting coupling housing portions 10b. Upon reaching the respective grooves of the fastening portions 26 of the respective other coupling member 100, the snap hooks of the fastening members 27 may engage therein so that the snap hooks may be pressed radially inwardly out of the respective recess. As a result, the sealing member receptacle 20 may now be moved along the spike from its movement end position facing the coupling side 13 in the direction of the spike receptacle 11 until the movement end position facing the spike receptacle 11 is reached, and thus until the connected state is reached. Due to the smaller inner diameter along this guidance path of the snap hooks compared to the diameter of the recesses, the snap hooks are locked in engagement with the grooves. The locking mechanism thereby retains the respective coupling-side sealing surfaces 22 of the coupling members 100 at a predetermined surface pressure and thereby in a fluid-tight manner.

In the connected state, on the one hand the front fluid opening 31 of the respective coupling member 100 now projects beyond its respective coupling side sealing surface 22, passes through the first portion of the sealing member 20 of the respective other coupling member 100 and is arranged in this sealing member 20 in the fluid-tight chamber 24 facing the coupling side 13. On the other hand, the respective fluid-tight chambers 24 of the respective coupling members 100 facing the coupling side 13 are pushed over the respective rear fluid openings 32. Consequently, in the connected state, both the rear fluid opening 32 of the respective coupling member 100 and the front fluid opening 31 of the respective other coupling member 100 are arranged in the respective fluid-tight chambers 24 facing the coupling side, so that fluid exchange is possible on both sides.

Figure 5:
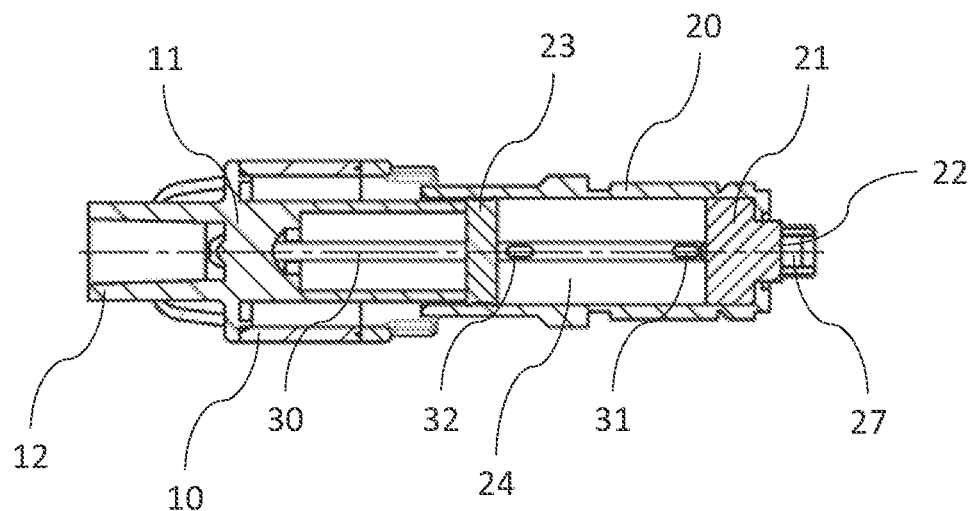
FIG. 5 is a cross-sectional view of a coupling member according to a second embodiment in a sectional plane through the fastening portions.
Figure 6:
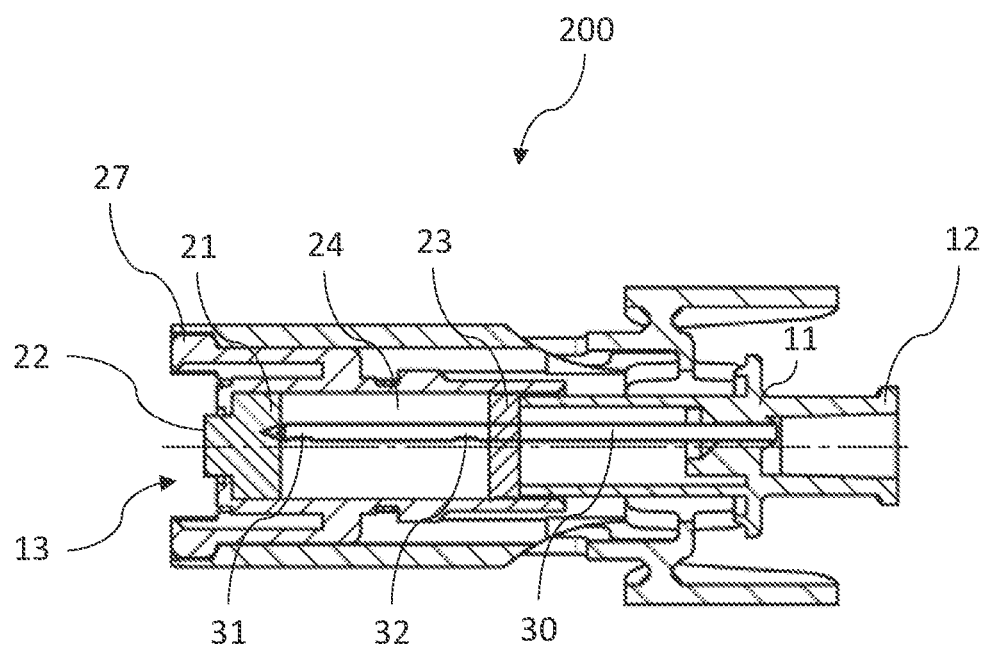
FIG. 6 is a cross-sectional view of a coupling member according to the second embodiment in a sectional plane through the fastening member portions.

FIG. 5 shows a cross-sectional view of a coupling member 200 according to a second embodiment in a sectional plane through the fastening member portions 26, and FIG. 6 shows a cross-sectional view of the coupling member 200 according to the second embodiment in a sectional plane through the fastening member portions 28. Following the first embodiment, the same reference signs are used for identical components, even though specific design features may differ from one another.

The coupling member 200 according to the second embodiment differs from the coupling member 100 of the first embodiment essentially in that the coupling member 200 comprises only one fluid-tight chamber 24. The fluid-tight chamber 24 is also not integrally formed by a sealing member 21, but by a sealing member 21 facing the coupling side 13 and a sealing member 23 facing the spike receptacle 11. The sealing member 21 facing the coupling side 13 is connected to the sealing member receptacle 20 in a positionally fixed manner, while the sealing member 23 facing the spike receptacle 11 is connected to the spike in a positionally fixed manner. In the disconnected state, both the front fluid opening 31 and the rear fluid opening 32 are located in the fluid-tight chamber 24 formed by the sealing members 21, 23.

Figure 7:
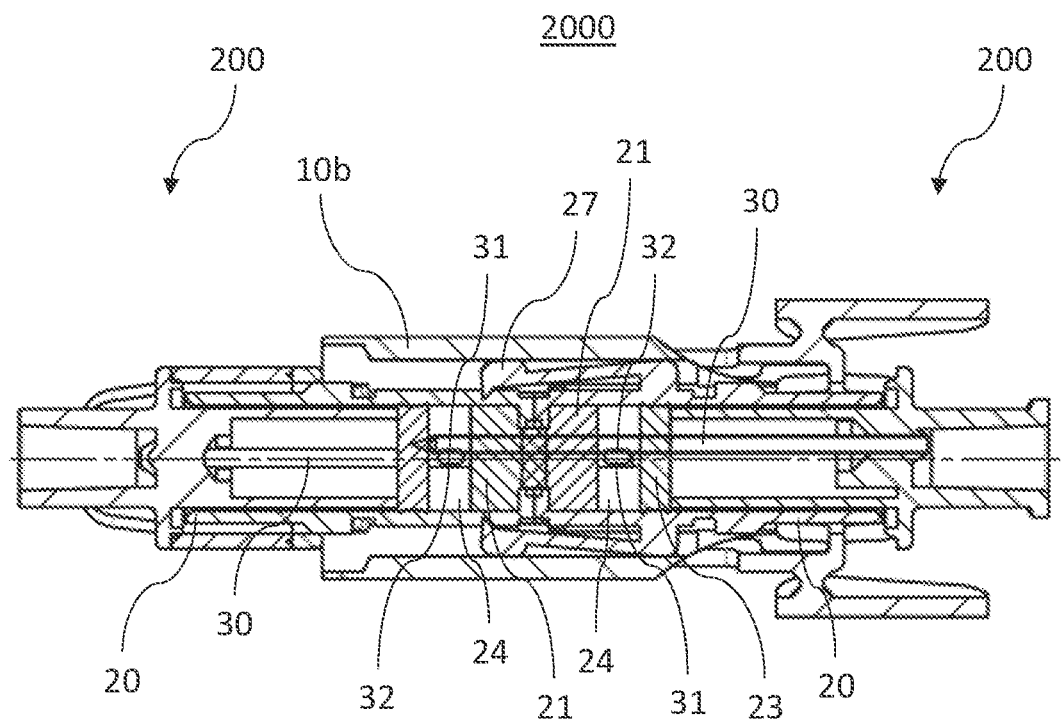
FIG. 7 is a cross-sectional view of a coupling system with two (one pair) coupling members according to the second embodiment in a connected state.

To further illustrate the coupling member 200, FIG. 7 shows a cross-sectional view of a coupling system 2000 with two coupling members 200 in a connected state. In accordance with the movement of the sealing member receptacles 20, the sealing members 21 facing the coupling side 13 and connected thereto in a positionally fixed manner are each moved in the direction of the spike receptacles 11 assignable to the respective coupling member 200. In the movement end position of the respective sealing member receptacle 21 facing the respective spike receptacle 11 in the connected state, the sealing member 21 facing the coupling side has reached a position in which the front fluid opening 32 projects beyond the sealing member 21 on the coupling side and the sealing member 21 continues to form with the sealing member 23 a fluid-tight chamber 24 for the rear fluid opening 32, wherein the front fluid opening of the respective other coupling member is likewise arranged in this fluid-tight chamber 24 in the connected state. In other words, the volume of the fluid-tight chamber 24 formed by the sealing members 21, 23 is reduced in the connected state compared to a disconnected state.

Figure 8:
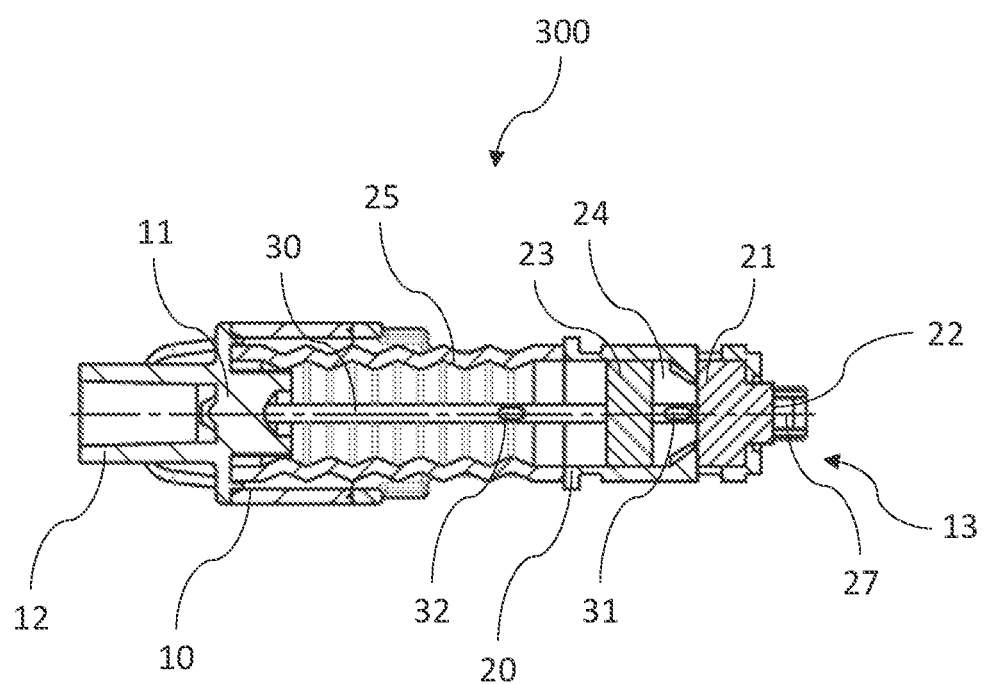
FIG. 8 is a cross-sectional view of a coupling member according to a third embodiment in a sectional plane through the fastening portions.
Figure 9:
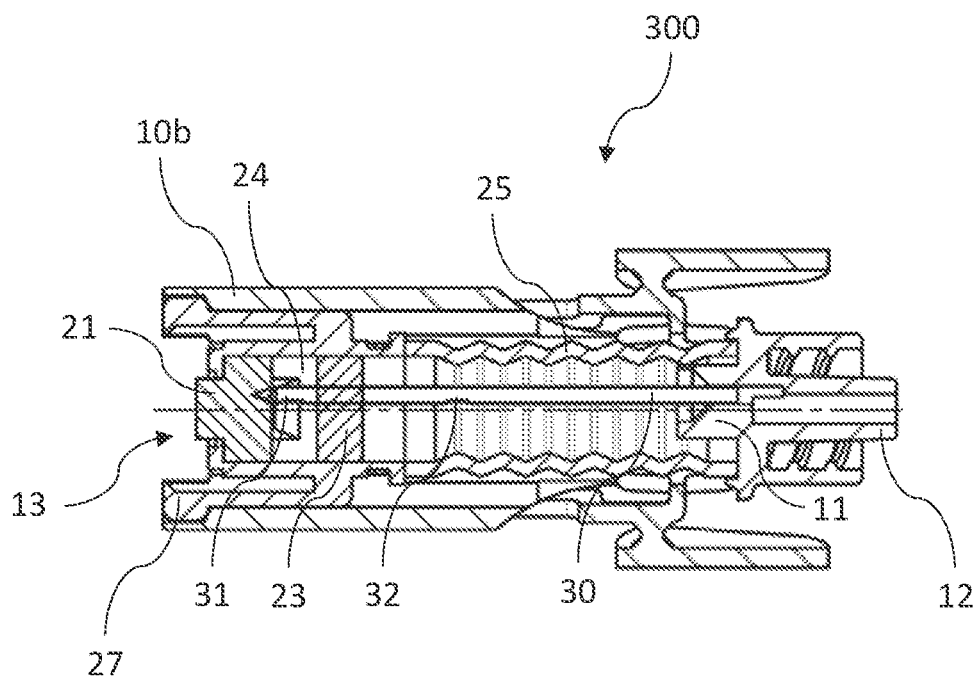
FIG. 9 is a cross-sectional view of a coupling member according to the third embodiment in a sectional plane through the fastening member portions.

As a further variant, FIG. 8 shows a cross-sectional view of a coupling member 300 according to a third embodiment in a sectional plane through the fastening portions 26, and FIG. 9 shows a cross-sectional view of the coupling member 300 according to the third embodiment in a sectional plane through the fastening member portions 28. Here, too, the same reference signs are used for comparable components.

Like the coupling member 200 of the second embodiment, the coupling member 300 of the third embodiment comprises two sealing members 21, 23, wherein here both sealing members 21, 23 are connected to the sealing member receptacle 21 in a positionally fixed manner movable along the spike 30. In the disconnected state, the front fluid opening 31 is arranged in the fluid-tight chamber 24 formed by the sealing members 21, 23, while the rear fluid opening is located on a side of the sealing member 23 facing the spike receptacle 11. In this configuration, to prevent fluid leakage, for example due to fluid residue at the rear fluid opening 32 or inadvertent or other fluid introduction into the spike 30, while allowing relative movement of the sealing member receptacle 20 along the spike, the coupling housing 10 comprises a compressible sealing member 25 that fluid-tightly connects the spike receptacle 11 to the sealing member receptacle 20. Moreover, an elastic configuration of the compressible sealing member 25 or other measures by which the compressible sealing member 25 strives to return from a compressed state to a decompressed initial state may support automatic re-attainment of the disconnected state if no external forces specifically counteract.

Figure 10:
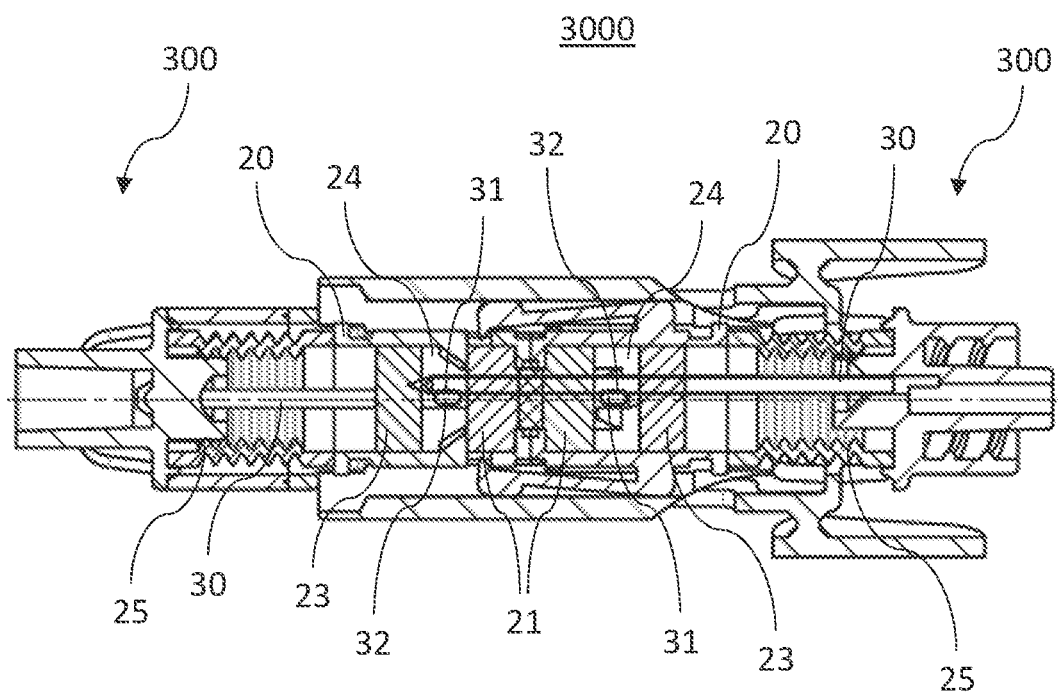
FIG. 10 is a cross-sectional view of a coupling system with two (one pair) coupling members according to the third embodiment in a connected state.

To further illustrate the coupling member 300, FIG. 10 shows a cross-sectional view of a coupling system 3000 with two coupling members 300 in a connected state. In accordance with the movement of the sealing member receptacles 20, the sealing members 21, 23 connected thereto in a positionally fixed manner are each moved in the direction of the spike receptacles 11 assignable to the respective coupling member 300. The sealing member 23 facing the respective spike receptacle 11 slides over the respective rear fluid opening 32. In the connected state, the rear fluid opening is then arranged in the respective fluid-tight chamber 24 formed by the sealing members 21, 23. In other words, the fluid-tight chamber 24 of the coupling member 300 does not change its volume, but its position. The respective front fluid opening 31 again projects into the fluid-tight chamber 24 of the respective other coupling member 300.

To illustrate an attachment in conjunction with a coupling member, FIG. 11 shows a cross-sectional view of the coupling member 300 according to the third embodiment in a sectional plane through the fastening member portions 28 and an attachment 400 in a disconnected state according to a coupling kit 4000 as shown in FIG. 12. The attachment 400 is formed by an attachment housing 410 that forms a fluid channel 411 extending from a fluid connection 412 toward a coupling side 413. In addition, the attachment 400 comprises a sealing member 421 received on the coupling side 413 through the attachment housing 410 to seal the fluid channel 411 to the outside on the coupling side 413. The attachment 400 may be connected to the coupling member 300 via a fastening portion 426. The fastening portion 426 is configured such that, when inserted into the coupling member 300, it retains the snap hooks of the fastening members 27 in the recesses of the protruding coupling housing portions 10b, which are movable radially inwardly to lock the fastening portion 426 in the sealing member receptacle 21 only when the sealing members 421, 21 reach a predetermined position relative to each other. Specifically, here the fastening portion 426 comprises, by way of example, over a length extending from the coupling side 413 in the direction of the fluid connection 412, a larger diameter than the attachment housing portion subsequent in the direction of the fluid connection 412.

For connection of the attachment 400 to the coupling member 300, FIG. 12 shows a cross-sectional view of a coupling kit 4000 with the coupling member 300 according to the third embodiment and the attachment 400 in a connected state. In the connected state, the sealing member receptacle 21 of the coupling member 300 is arranged in a movement end position facing the spike receptacle 11. In this position of the sealing member receptacle, the rear fluid opening 32 is located in the fluid-tight chamber 24 and the front fluid opening protrudes beyond the sealing surface 22 of the sealing member 21 facing the coupling side 13 and is arranged in the fluid channel 411 on a side of the sealing member 421 facing the fluid connection 412. In the embodiment shown, the fluid connection 412 forms a radial shoulder corresponding to the radial recesses in the projecting coupling housing portions 10b. Accordingly, the radial recesses in the projecting coupling housing portions 10b form a stop for the fluid connection 412 and thus for the attachment housing 410, by means of which the insertion of the attachment 400 into the coupling member 300 is limited. This results analogously in the movement end position of the sealing member receptacle 21 facing the spike receptacle 11.

Figure 13:
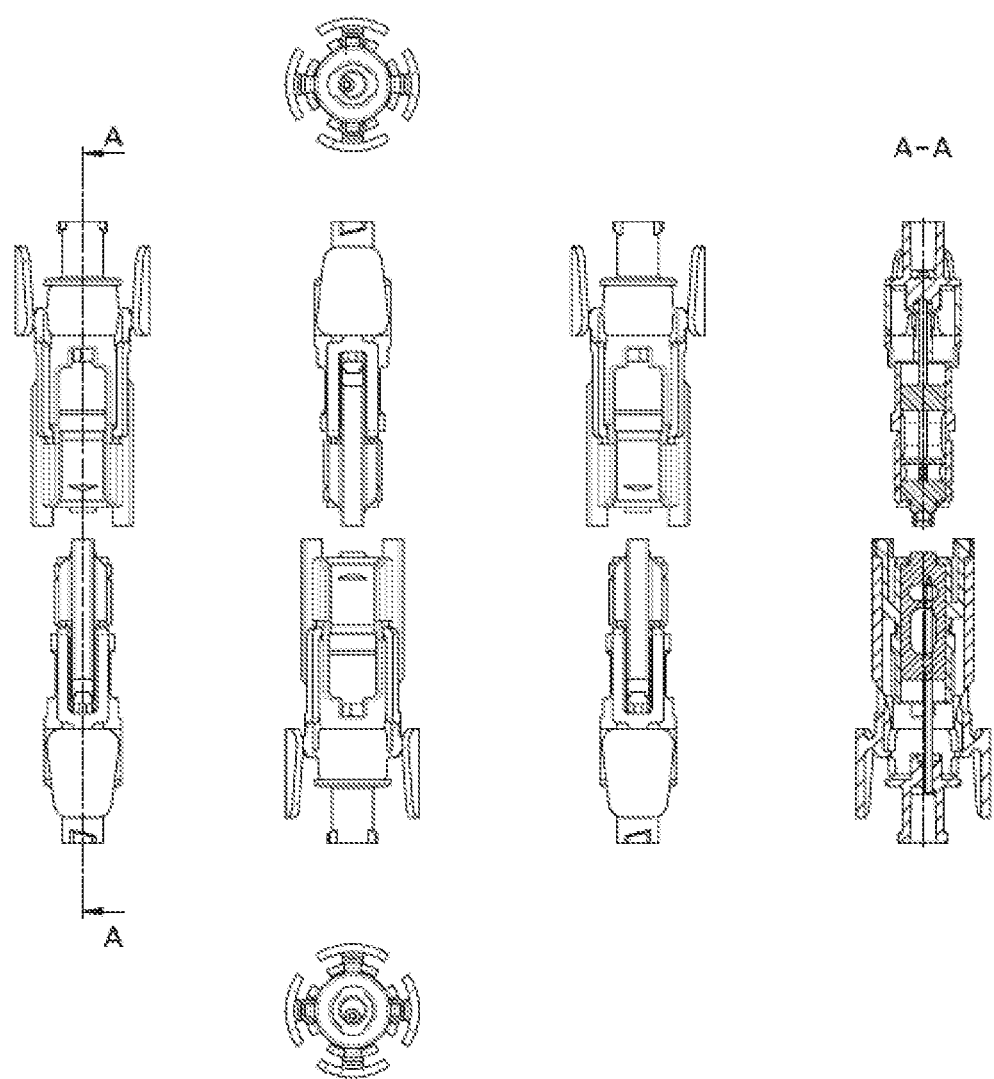
FIG. 13 is an overview of the external views of the coupling system according to FIGS. 1 to 4, the cross-sectional view along the intersection line A-A, and a perspective view in the disconnected state.
Figure 13:
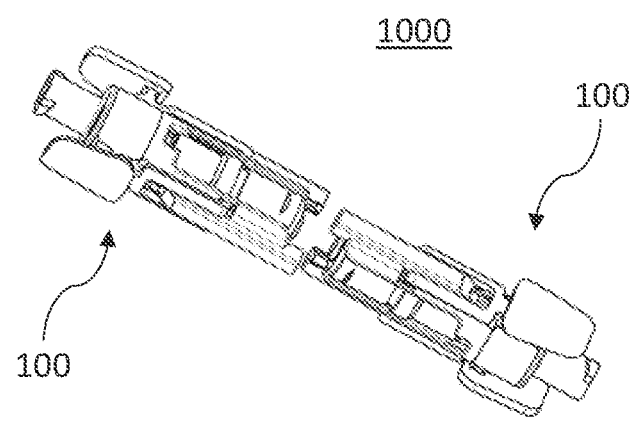
Figure 14:
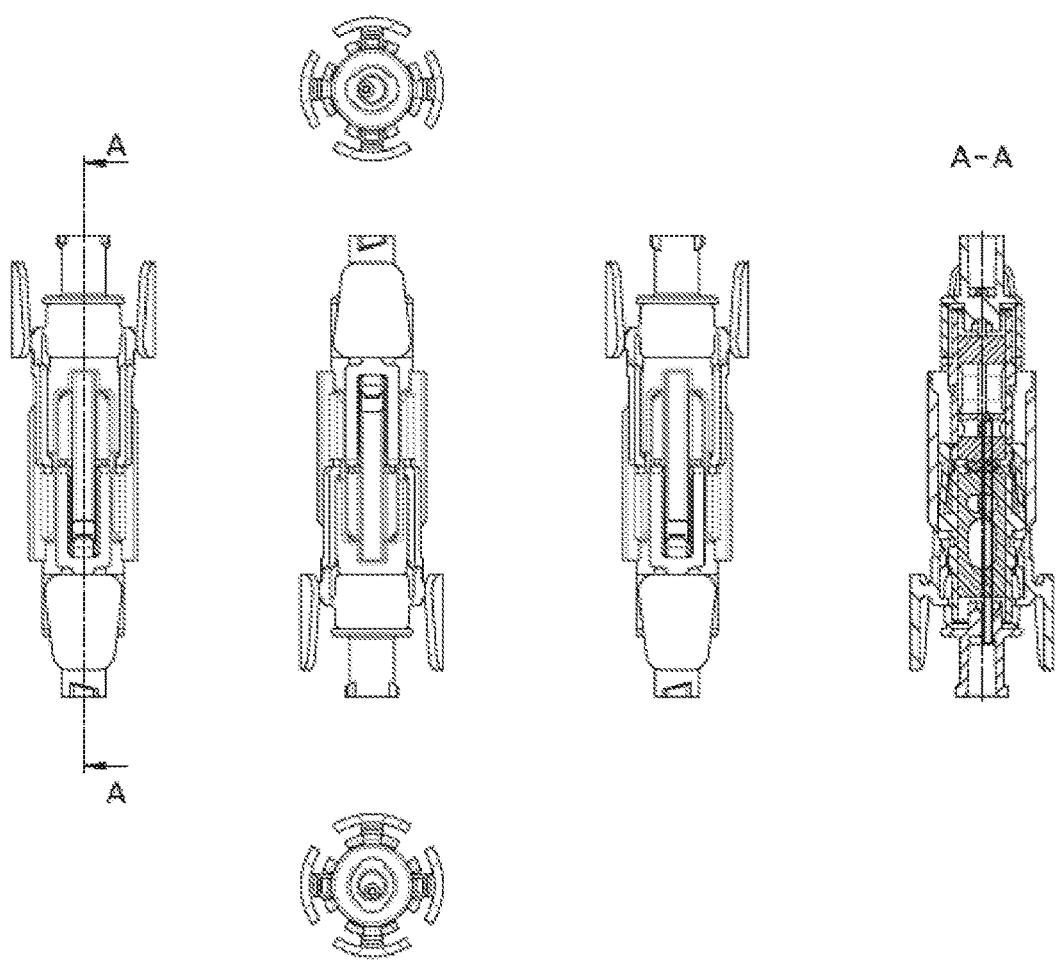
FIG. 14 is an overview of the external views of the coupling system according to FIGS. 1 to 4 and FIG. 13, respectively, the sectional view along intersection line A-A as well as a perspective view in the connected state.
Figure 14:
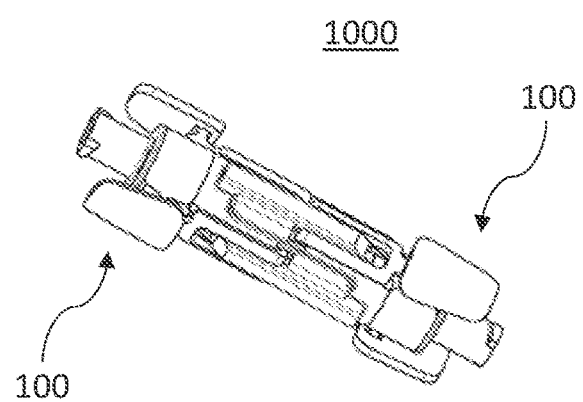
Figure 15:
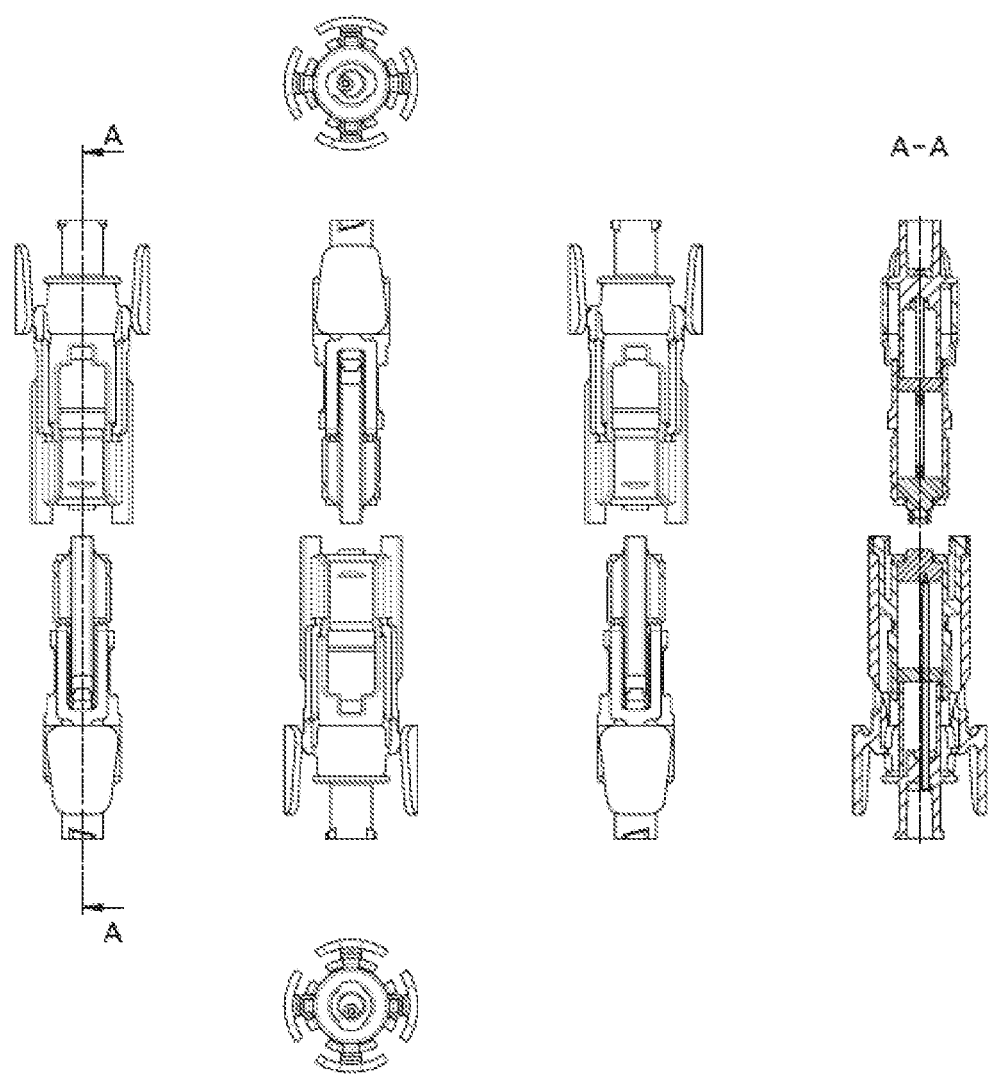
FIG. 15 is an overview of the external views of the coupling system according to FIGS. 5 to 7, the sectional view along intersection line A-A as well as a perspective view in the disconnected state.
Figure 15:
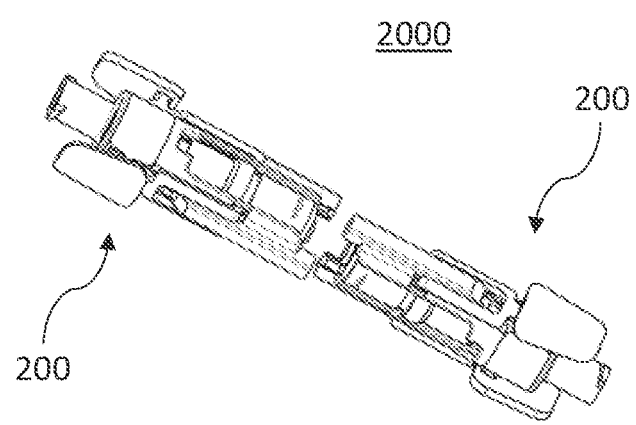
Figure 16:
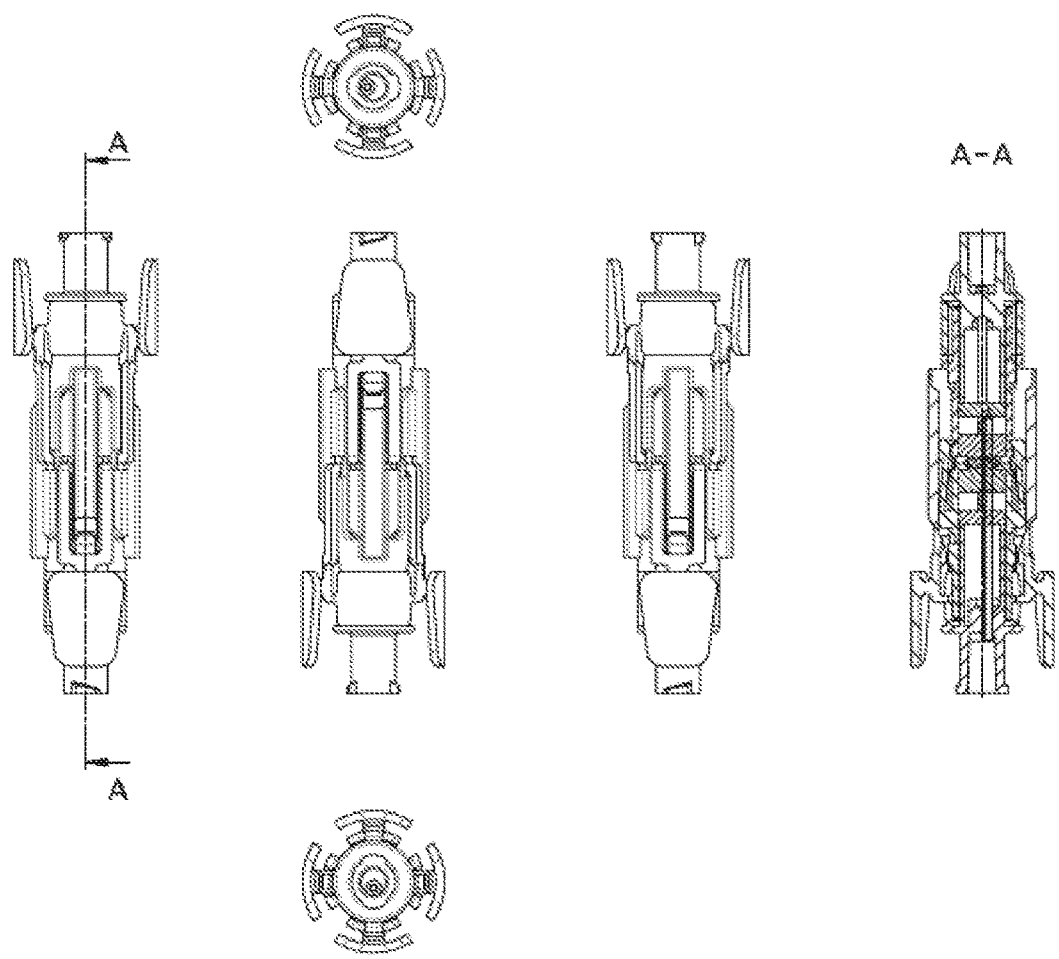
FIG. 16 is an overview of the external views of the coupling system according to FIGS. 5 to 7 and FIG. 15, respectively, the sectional view along intersection line A-A as well as a perspective view in the connected state.
Figure 16:
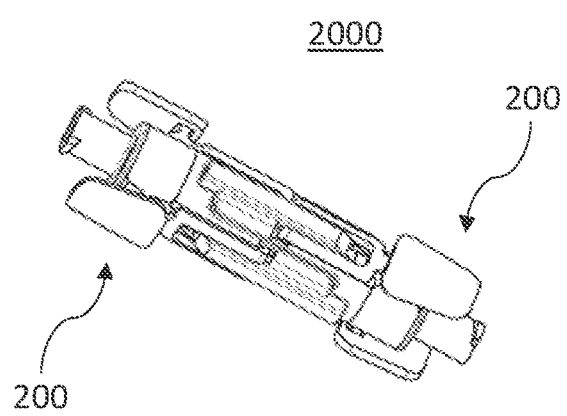
Figure 17:
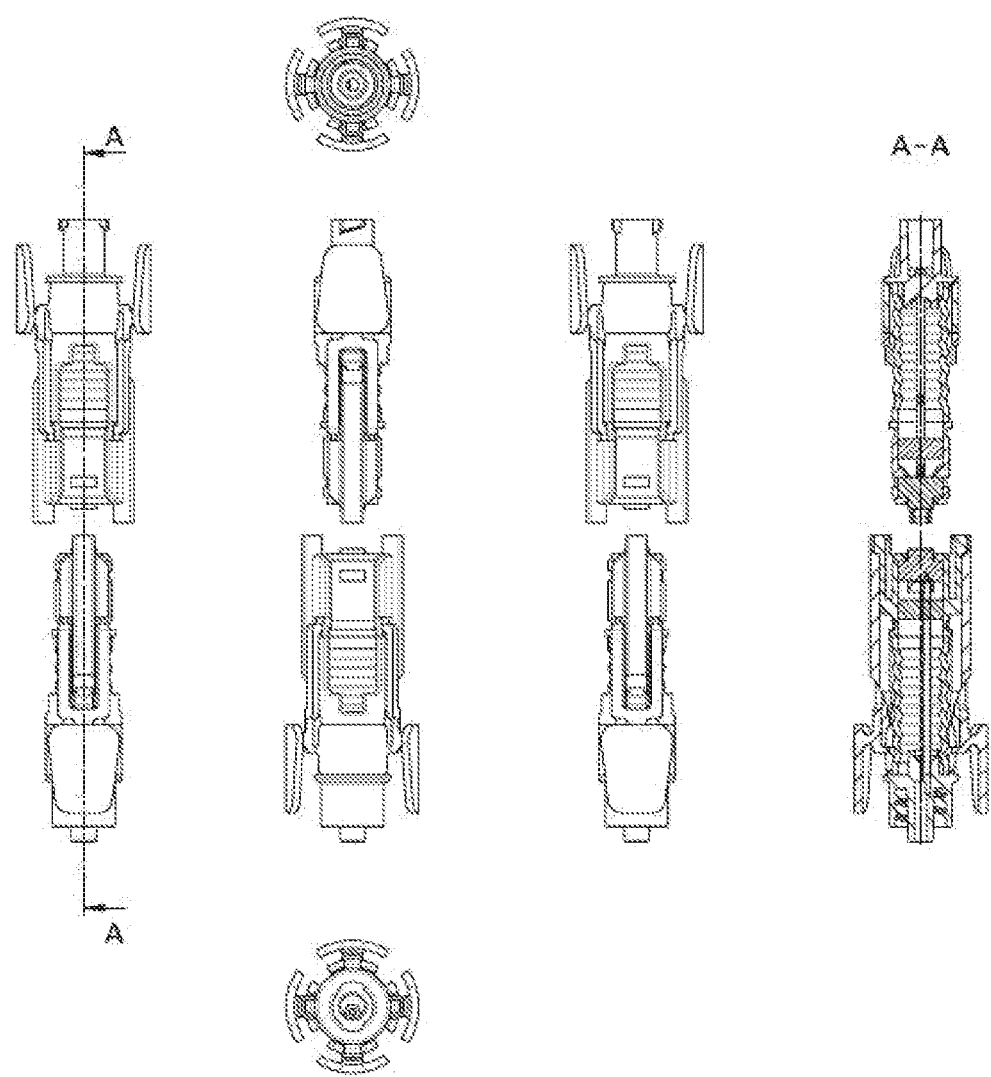
FIG. 17 is an overview of the external views of the coupling system according to FIGS. 8 to 10, the sectional view along intersection line A-A as well as a perspective view in the disconnected state.
Figure 17:
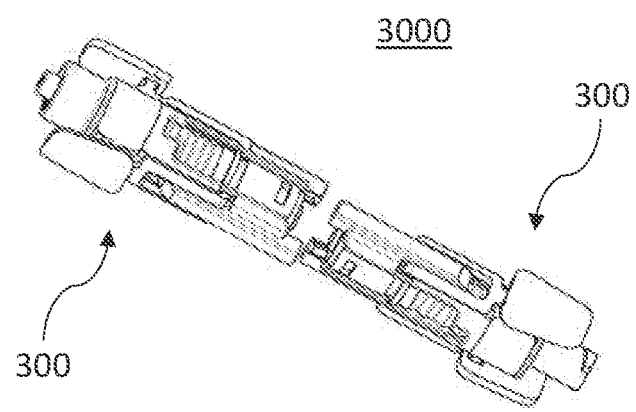
Figure 18:
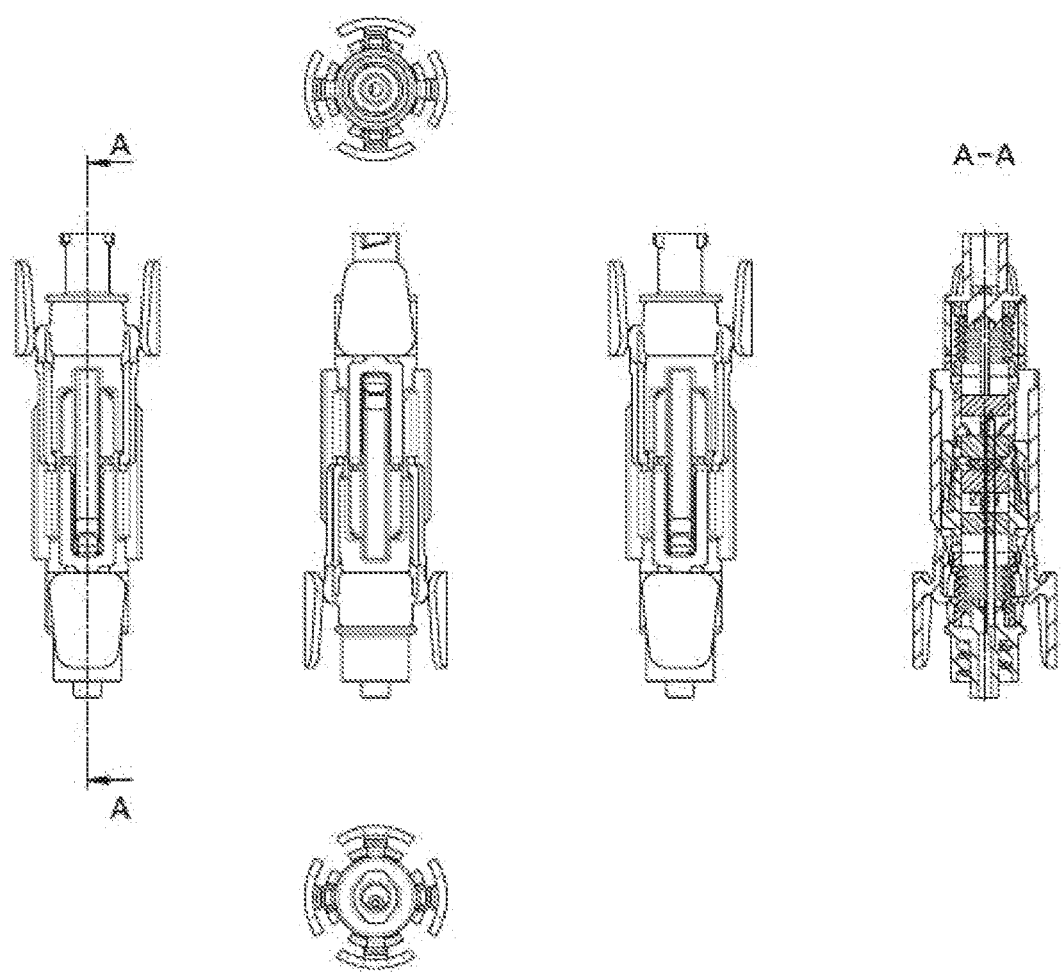
FIG. 18 is an overview of the external views of the coupling system according to FIGS. 8 to 10 and FIG. 17, respectively, the sectional view along intersection line A-A as well as a perspective view in the connected state.
Figure 18:
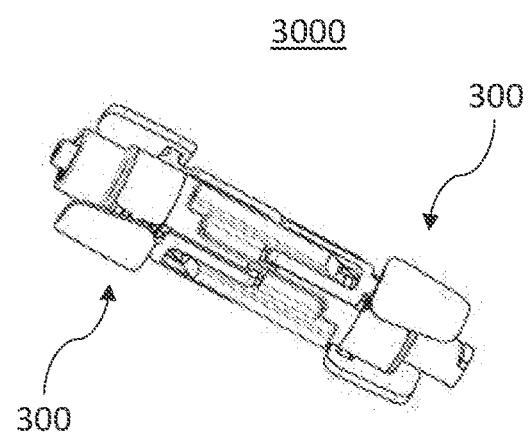

In addition, FIG. 13 shows an overview of the external views of the coupling system according to FIGS. 1 to 4, the sectional view along intersection line A-A and a perspective view in the disconnected state. Similarly, FIG. 14 shows an overview according to FIG. 13 in a connected state. For FIGS. 5 to 7, FIGS. 15 and 16, for FIGS. 8 to 10, FIGS. 17 and 18, and for FIGS. 11 and 12, FIGS. 19 and 20 show the respective overviews for the disconnected and connected states. From this, further design features of the described embodiments can be obtained.

The invention is not limited to the described embodiments. In particular, certain features of one embodiment are in principle also applicable to other embodiments, provided that this is not reasonably precluded. Even though the coupling systems described in more detail each comprise structurally identical coupling members, complementary coupling members may also be used. For example, a coupling system may comprise a coupling member according to the first embodiment as well as a coupling member according to the second embodiment, wherein the coupling members differ here only in the design of their sealing members, without contradicting their connection for fluid exchange. Also, the attachment described above is not limited to a connection with the coupling member according to the third embodiment, but may also be connectable with the other coupling members and variants thereof.

The invention claimed is:

1. A pair of coupling members for a joint closed fluid transfer system, wherein each coupling member of the pair of coupling members comprises:
   a coupling housing having a longitudinal axis and comprising a fluid connection and a coupling side;
   a sealing member receptacle, arranged in the coupling housing, comprising at least one fluid-tight chamber formed by at least one sealing member arranged in the sealing member receptacle; and
   a spike in the coupling housing in a spike receptacle for fluid communication with the fluid connection,
   wherein the pair of coupling members are each complementary to one another and are connectable without an adapter by a relative angular offset about their longitudinal axis, and
   wherein the coupling members are structurally identical.

2. The pair of coupling members according to claim 1, wherein the spike is arranged eccentrically in the coupling housing.

3. The pair of coupling members according to claim 1, wherein the coupling members are connectable by a relative angular offset of 90° about their longitudinal axis.

4. A coupling member for a closed fluid transfer system comprising:
   a coupling housing comprising a fluid connection and a coupling side;
   a sealing member receptacle, arranged in the coupling housing, comprising at least one fluid-tight chamber formed by at least one sealing member arranged in the sealing member receptacle; and
   a spike in the coupling housing in a spike receptacle for fluid communication with the fluid connection,
   wherein the sealing member receptacle is movable in a direction along the spike relative to the spike, and/or the spike is movable in its longitudinal direction relative to the sealing member receptacle,
   wherein the spike, starting from a spike tip facing away from the spike receptacle, comprises at least one front fluid opening and a rear fluid opening
   wherein the front fluid opening is positioned such that it projects beyond the side of the fluid-tight chamber facing away from the spike receptacle in a movement end position of the sealing member receptacle facing the spike receptacle and/or in a movement end position of the spike facing the coupling side, and is arranged in the fluid-tight chamber in a movement end position of the sealing member receptacle facing away from the spike receptacle and/or in a movement end position of the spike facing away from the coupling side,
   wherein the coupling member comprises, in a radial circumferential surface with respect to the direction of extension of the spike in the circumferential direction, at least two fastening portions, which are each formed for the engagement of a fastening member, and wherein the radial circumferential surface forms fastening member portions in the regions located between the fastening portions in the circumferential direction, each of which comprising at least one fastening member, and
   wherein the fastening portions and the fastening member portions are formed complementary to each other such that a fluid-tight communication is accomplished when connected to a structurally identical coupling member.

5. The coupling member according to claim 4, wherein the at least one rear fluid opening is arranged in the fluid-tight chamber in a movement end position of the sealing member receptacle facing the spike receptacle and/or in a movement end position of the spike facing the coupling side.

6. The coupling member according to claim 4, wherein the fluid-tight chamber is formed by two sealing members.

7. The coupling member according to claim 4, wherein the coupling housing comprises a compressible sealing member, which connects the spike receptacle with the sealing member receptacle in a fluid-tight manner.

8. The coupling member according to claim 4, wherein the at least one fastening member of the respective fastening member portion is formed by the sealing member receptacle.

9. The coupling member according to claim 4, wherein the coupling housing is relatively movable with respect to the sealing member receptacle only when the respective fastening member forms a coupling state with the fastening portion of the other coupling member when connected to a complementary or structurally identical coupling member.

10. An attachment for a coupling member according to claim 4, wherein the attachment comprises a fastening portion configured such that it is affixable in the coupling member in a movement end position of the sealing member receptacle facing the spike receptacle.

11. A coupling system comprising two coupling members according to claim 4.

12. The coupling system according to claim 11, wherein at least one of the respective front fluid openings is arranged in the fluid-tight chamber of the respective other coupling member in a coupling state, in which the respective sealing member receptacles are located in a movement end position facing the respective spike receptacle, and is in fluid communication with the respective rear fluid opening of the other coupling member.

13. The coupling system according to claim 11, wherein the sealing surfaces of the sealing members of the coupling members facing the coupling side are in contact with each other in the coupling state, and the contact is only cancelled when the respective sealing member receptacles are in a movement end position facing away from the respective spike receptacle.

14. A coupling kit comprising:
   a coupling member according to claim 4; and an attachment comprising a fastening portion that is affixable in the coupling member in a movement end position of the sealing member receptacle facing the spike receptacle.

15. The coupling member according to claim 4, wherein the spike is arranged eccentrically in the coupling housing.

16. The coupling member according to claim 6, wherein the sealing member facing the spike receptacle is in a positionally fixed relationship relative to the spike and the sealing member receptacle is movable thereto relative to the spike.

17. The coupling member according to claim 4, wherein the fastening portions are formed by the sealing member receptacle, which are accessible from the coupling side by means of recesses in the coupling housing, which are open towards the coupling side.

18. The coupling member according to claim 4, wherein the fastening member portions correspond to the fastening portions.

19. The coupling member according to claim 8, wherein the fastening members of the sealing receptacle are affixable in a fastening portion via the coupling housing.

20. The coupling system according to claim 12, wherein both of the front fluid openings are arranged in the fluid-tight chamber of the respective other coupling member in the coupled state.

21. The coupling system according to claim 12, wherein the respective rear fluid opening of the other coupling member is also arranged in said fluid-tight chamber in the coupling state.

* * * * *